(12) United States Patent
Schamin

(10) Patent No.: US 11,384,793 B2
(45) Date of Patent: Jul. 12, 2022

(54) ROLLING BEARINGS HAVING AN INTEGRATED CURRENT-REMOVAL FUNCTION

(71) Applicant: Schaeffler Technologies AG & Co. KG, Herzogenaurach (DE)

(72) Inventor: Alexander Schamin, Oberasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/253,200

(22) PCT Filed: Feb. 18, 2019

(86) PCT No.: PCT/DE2019/100148
§ 371 (c)(1),
(2) Date: Dec. 17, 2020

(87) PCT Pub. No.: WO2020/001674
PCT Pub. Date: Jan. 2, 2020

(65) Prior Publication Data
US 2021/0115974 A1    Apr. 22, 2021

(30) Foreign Application Priority Data
Jun. 29, 2018 (DE) ..................... 10 2018 115 732.0

(51) Int. Cl.
*F16C 41/00* (2006.01)
*F16C 19/06* (2006.01)
*F16C 19/52* (2006.01)

(52) U.S. Cl.
CPC ............ *F16C 41/002* (2013.01); *F16C 19/06* (2013.01); *F16C 19/52* (2013.01); *F16C 2202/32* (2013.01)

(58) Field of Classification Search
CPC ................ F16C 33/7823; F16C 33/784; F16C 33/7853; F16C 33/7856; F16C 41/002; F16C 2202/32
See application file for complete search history.

(56) References Cited

U.S. PATENT DOCUMENTS

| 3,564,477 A | 2/1971 | Pompei | |
| 5,863,135 A * | 1/1999 | Bildtsen | F16C 33/32 384/477 |
| 9,790,995 B2 * | 10/2017 | White | F16C 19/52 |
| 10,253,815 B2 * | 4/2019 | Hart | F16C 33/7869 |
| 2004/0081380 A1 * | 4/2004 | Katagiri | F16C 13/02 384/462 |

(Continued)

FOREIGN PATENT DOCUMENTS

| CN | 104718386 A | 6/2015 |
| DE | 102014204719 A1 | 11/2014 |

(Continued)

*Primary Examiner* — James Pilkington

(57) ABSTRACT

A rolling bearing for rotatably supporting a shaft has an inner ring with a first raceway for a rolling body, an outer ring with a second raceway for a rolling body, and rolling bodies which are arranged between the raceways of the bearing rings. At least two plates are fastened to a first of the bearing rings, wherein an electrically conducting element is arranged between the two plates, which electrically conducting element lies against the respective other bearing ring or a component which is connected to the respective other bearing ring.

16 Claims, 2 Drawing Sheets

(56) References Cited

U.S. PATENT DOCUMENTS

| | | | |
|---|---|---|---|
| 2004/0091380 A1 | 5/2004 | Kriehn et al. | |
| 2004/0184215 A1* | 9/2004 | Oh | H05F 3/02 361/220 |
| 2011/0317953 A1* | 12/2011 | Moratz | F16C 33/7843 384/572 |
| 2016/0003298 A1* | 1/2016 | Masuch | F16C 33/50 384/573 |
| 2016/0032981 A1* | 2/2016 | White | F16C 33/7816 384/448 |
| 2017/0108047 A1* | 4/2017 | White | F16C 33/82 |

FOREIGN PATENT DOCUMENTS

| | | | |
|---|---|---|---|
| DE | 102014112561 A1 | | 3/2016 |
| DE | 102016217872 A1 | | 4/2017 |
| DE | 102017106695 B3 | | 4/2018 |
| DE | 102018117315 A1 | | 1/2020 |
| EP | 1755207 A2 | | 2/2007 |
| JP | 2007231483 A | | 9/2007 |
| JP | 2008286229 A | | 11/2008 |
| JP | 2012097856 A | | 5/2012 |
| JP | 2014088891 | * | 5/2014 |
| JP | 6227096 B1 | | 11/2017 |
| WO | 2015086096 A1 | | 6/2015 |
| WO | 15134243 A1 | | 9/2015 |
| WO | 2017148586 A1 | | 9/2017 |

\* cited by examiner

ROLLING BEARINGS HAVING AN INTEGRATED CURRENT-REMOVAL FUNCTION

CROSS-REFERENCE TO RELATED APPLICATIONS

This application is the U.S. National Phase of PCT Appln. No. PCT/DE2019/100148 filed Feb. 18, 2019, which claims priority to DE 10 2018 115 732.0 filed Jun. 29, 2018, the entire disclosures of which are incorporated by reference herein.

TECHNICAL FIELD

The disclosure relates to a rolling bearing having an integrated current-removal function and a method for producing such a rolling bearing.

BACKGROUND

Rotating shafts, for example of turbines, electric motors or other shafts, are known from the prior art, which are electrically conductively connected to components to which an electrical voltage is induced or in which an electrical voltage can build up during operation. Such a build-up of an electrical voltage is known in particular in the case of a drive shaft of an electrical alternating current motor, whereby high voltages can arise between an electrically charged component and another component. While the electric motor is in operation, the electrical resistance in the bearings increases, whereby a charge is generated on the surface of the rotating shaft. This can result in high voltage differences, which are discharged on an electrical path with the lowest resistance. This discharge can lead to an electrical spark, which causes the erosion of material on a surface. If the electrical path with the lowest electrical resistance leads through the rolling bearing, damage to the surface of the rolling bodies or to the raceways of the rolling bodies can occur, which can damage the rolling bearing and lead to premature failure of the rolling bearing.

To avoid this, rotating shafts of electrical components are known from the prior art, in which potential equalization takes place, for example, by means of sliding copper brushes. From EP 1 755 207 A2 an assembly for supporting and sealing a shaft is known, which has a brush unit with electrically conducting, thin fibers. Such electrically conducting fibers can create potential equalization between the housing and the shaft so that the electrical path with the lowest resistance does not lead through the rolling bodies of the rolling bearing and thus the risk of damage and premature failure is reduced.

From WO 2015/086096 A1 a sealing arrangement is known, which is arranged on a first machine component, for example a housing and which has sliding contact on a second machine component, for example a shaft, wherein at least one sealing lip of the sealing arrangement lies on the second machine component. In addition, the sealing arrangement has a contact element which is electrically conducting and thus enables potential equalization between the first machine component and the second machine component.

DE 10 2014 112 561 A1 discloses a rolling bearing with an electrical bypass for the rolling bodies, in which an electrically conducting film is arranged on at least one side of the rolling bearing, which is in electrically conducting connection as a current bridge with the outer ring and the inner ring. The film forms an electrical current path that bypasses the rolling bodies for conducting away an electrical current occurring between the outer ring and the inner ring.

From DE 10 2014 204 719 A1 a rolling bearing with an integrated shunt is known, which is provided with protection against damage by electrical discharge. For this purpose, a protective shield is provided between the inner ring and the outer ring of the rolling bearing, which extends radially between the inner ring and the outer ring, wherein the protective shield has a body part and at least one electrically conducting seal, wherein electrically conducting fibers protrude from the body, which lie against one of the bearing rings.

Furthermore, DE 10 2017 106 695 B3 discloses a rolling bearing for supporting a drive shaft in an electric motor, wherein a carbon fiber composite component is fastened between an inner ring and an outer ring of the rolling bearing, which has a carrier element and carbon fibers embedded in the carrier element, wherein the carbon fibers lie on the respective other bearing ring and thus create a shunt.

SUMMARY

However, the disadvantage of the known solutions is that either wear occurs on the copper brushes, which reduces the service life of the rolling bearing or requires replacement of the copper brushes, or in the case of a solution with individual thin carbon fibers, there is a risk of the fibers breaking or of an undefined position of the carbon fibers in relation to the respective opposite rolling bearing ring or shaft. A solution with a carbon fiber composite component is comparatively complex to assemble and therefore correspondingly costly.

It is desirable to propose a rolling bearing which enables an essentially wear-free equalization of electrical potentials between an inner ring and an outer ring of the rolling bearing, wherein assembly is simplified, robustness is increased and costs are reduced.

A rolling bearing for rotatably supporting a shaft, in particular a drive shaft of an electric motor, has an inner ring with a first raceway for a rolling body, an outer ring with a second raceway for a rolling body, and rolling bodies arranged between the raceways of the bearing rings. At least two plates are fastened to a first one of the bearing rings, wherein an electrically conducting element is arranged between the two plates, which electrically conducting element lies against the respective other bearing ring or a component which is connected to the respective other bearing ring. A corresponding assembly of two plates with an electrically conducting element clamped therebetween can be produced simply and inexpensively. Such an assembly can simply be pressed in during the assembly of the rolling bearing, wherein a non-positive connection is preferably established between the assembly, in particular between one of the plates, and the outer ring of the rolling bearing. As a result, a current-removal function can be integrated into the rolling bearing in a simple and inexpensive manner. In addition, the proposed solution has comparatively little friction between the electrically conducting element and one of the bearing rings or a component connected to the bearing ring. As a result, both the losses on the rolling bearing and the wear can be minimized. By clamping the electrically conducting element between the two plates, a comparatively high rigidity can also be achieved, such that the risk of the electrically conducting element lifting off the bearing ring or the component connected to the bearing ring is minimized and the electrically conducting component therefore always lies in a defined position.

Advantageous improvements and further developments of the rolling bearing are possible.

The electrically conducting element may have an opening, preferably a central opening, through which a shaft rotatably supported by means of the rolling bearing can be passed. A particularly simple mounting of the rolling bearing and a bearing arrangement designed therewith is possible in that the assembly made up of the plates and the electrically conducting element is simply pushed over the shaft. In addition, a central opening makes it possible to dispense with positional orientation of the assembly. In addition, a central opening ensures that the electrically conducting element lies evenly on the shaft or the inner ring, so that an electrically conducting shunt between the inner ring and the outer ring of the rolling bearing via the electrically conducting element is always guaranteed.

The plates may be annular. It is preferable if an inner diameter of the rings is greater than the diameter of the opening in the electrically conducting element. As a result, the electrically conducting element protrudes in the radial direction over the plates. This ensures that the plates do not come into contact with the inner ring or the shaft.

The electrically conducting element may be divided into individual contact segments. The contact surface between the electrically conducting element and the inner ring or a shaft connected to the inner ring can be reduced, as a result of which the friction losses of the rolling bearing can be minimized.

Alternatively, the electrically conducting element may protrude outward in the radial direction over the plates and the plates may be fastened to the inner ring of the rolling bearing. In this embodiment, the electrically conducting element has an opening which preferably corresponds to the inner diameter of the plates, such that a simple non-positive connection of the plates to the inner ring of the rolling bearing is possible.

The electrically conducting element may be a fabric blank or a non-woven disc. A fabric blank or a non-woven disc has a high degree of flexibility, such that the exposed areas can lie against the respective bearing ring or the component connected to the bearing ring, in particular the inner ring or the shaft, without high friction losses. As a result, a shunt that minimizes friction loss can be formed, which enables electrical potential equalization between the outer ring and the inner ring of the rolling bearing.

electrically conducting threads and/or electrically conducting additives may be incorporated into the fabric of the fabric blank or into the non-woven disc. The electrical conductivity can be increased by means of woven-in threads or electrically conducting additives introduced into the fabric blank or the non-woven disc. Alternatively, the electrical conductivity can be produced by such electrically conducting threads or additives if the base material, i.e., the fabric or the non-woven material, is electrically non-conductive.

The electrically conducting element may be a disc or a film made of a polymer material, wherein the disc or the film is provided with electrically conducting additives. Alternatively, an electrically conducting plastic can also be used for the disc or film. By means of a polymer material, a higher rigidity can be achieved in comparison to a fabric or a non-woven material, as a result of which the contact of the electrically conducting element on the shaft or the bearing ring is improved. This can reduce the risk of lifting.

The electrically conducting additives may be carbon black, graphite, carbon and/or nanotubes. The materials mentioned each have the property of conducting electrical current, wherein they can be added to the base material of the polymer in a comparatively simple manner during manufacture. Carbon fibers and nanotubes also have the advantage that they can be introduced into the matrix structure of the polymer in a correspondingly oriented manner, such that a defined current path is formed in the radial direction, which enables potential equalization between the two bearing rings of the rolling bearing and the associated components.

A sleeve may be arranged on the inner ring or on the shaft connected to the inner ring. The sleeve is preferably coated in order to minimize friction. The sleeve can be pressed onto the shaft or the inner ring in order to form a stable, form-fitting connection.

The sleeve may have a first area which runs parallel to the surface of the shaft or the inner ring and a second area which runs at an angle to the first area, preferably at right angles to the first area, such that the second area prevents or reduces leakage of lubricant from the area of the rolling bodies, such that a contact point between the electrically conducting element and the inner ring or the shaft is kept essentially free of lubricant. In such a configuration, the sleeve can be part of a labyrinth seal of the rolling bearing, with which the penetration of dirt into the area of the rolling bodies is prevented and at the same time a leakage of lubricant from the area of the rolling bodies is minimized. As a result, the contact area between the electrically conducting element and the sleeve is kept free of lubricant, such that the current path is not interrupted by an insulating lubricant.

The plates may have a bend, in particular a bend with an angle of 30 to 60 degrees, whereby the electrically conducting element is guided in such a way that it lies against the inner ring, the shaft or the sleeve at an angle deviating from a right angle, in particular at an angle between 30 and 60 degrees. The bend makes it possible, on the one hand, to ensure that the electrically conducting element is held between the plates in a more stable manner, such that the risk of the electrically conducting element slipping out of its being clamped between the plates is reduced. On the other hand, the lying of the electrically conducting element on the inner ring, the shaft or the sleeve leads to the fact that the friction between the electrically conducting element and the inner ring, the shaft or the sleeve is reduced, whereby the friction losses of the rolling bearing can be minimized.

A method for producing a rolling bearing for rotatably supporting a drive shaft is proposed, wherein the rolling bearing has an inner ring with a first raceway for rolling bodies and an outer ring with a second raceway for rolling bodies, and rolling bodies arranged between the raceways of the bearing rings. An electrically conducting element is clamped between two plates, wherein a preferably central opening is made in the electrically conducting element clamped between the plates, and wherein the two plates are fastened to one of the bearing rings of the rolling bearing. In the case of an electrically conducting element clamped between the two plates, the opening can be made in the electrically conducting element by a simple punching or cutting process, such that it is also possible to process a flexible and less rigid material. In addition, clamping the electrically conducting element offers the possibility of defining the position of the opening in relation to the plates, such that an assembly of two plates and an electrically conducting element clamped therebetween is created, wherein the electrically conducting element protrudes beyond the inner diameter of the plates. This can ensure that only the electrically conducting element comes into contact with the inner ring or the shaft, but that contact between the plates and the inner ring or the shaft is avoided.

The various embodiments may be advantageously combined, unless otherwise indicated in the individual case.

BRIEF DESCRIPTION OF THE DRAWINGS

In the following, the bearing is explained in more detail by means of a preferred exemplary embodiment and the corresponding drawings. In the figures.

DETAILED DESCRIPTION

Figure 1:
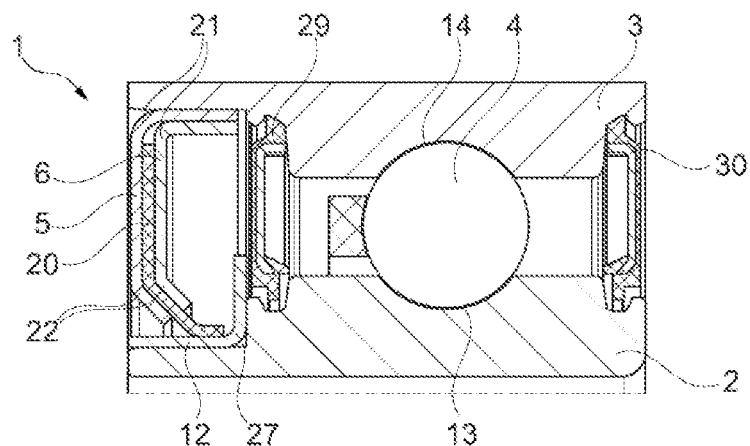
FIG. 1 shows an exemplary embodiment of a rolling bearing with an integrated current-removal function via an electrically conducting element held between two discs.

FIG. 1 shows an exemplary embodiment of a rolling bearing 1 for use on an electric motor, in particular for supporting a shaft 15, in particular the drive shaft of the electric motor, with an integrated current-removal function. The rolling bearing 1 comprises an inner ring 2 and an outer ring 3, which can be rotated relative to one another. For this purpose, raceways 13, 14 are formed on the inner ring 2 and the outer ring 3, in which rolling bodies 4, in particular balls or rollers, are guided. The inner ring 2 is carried by the drive shaft of the electric motor and is non-rotatably connected to this shaft 15. For this purpose, the inner ring 2 can in particular be pressed onto the shaft 15. The outer ring 3 is arranged in a housing of the electric motor and non-rotatably connected to this housing. Two plates 5, 6, between which an electrically conducting element 7 is clamped, are pressed into the outer ring 3 of the rolling bearing 1. The electrically conducting element 7 is preferably designed as a blank 8, in particular as a fabric blank 17, a non-woven disc 18 or a thin disc 19 made of a polymer material. The plates 5, 6 have an angle 21 and a further bend 22 in order to enable both simple clamping on the outer ring 3 and stable accommodation of the electrically conducting element 7. The plates 5, 6 are bent at the bend 22 in such a way that the electrically conducting element 7 is oriented at an angle deviating from a right angle, in particular at an angle between 30° and 60°, to the inner ring 2 or to the shaft 15, whereby the friction compared to a right-angled contact between the inner ring 2 or the shaft 15 and the electrically conducting element 7 can be reduced. In order to minimize the friction or to improve the current-removal function, a preferably coated sleeve 12 can be pressed onto the shaft 15 or the inner ring 2. The sleeve 12 has an angle 27 in order to minimize the leakage of lubricant from the area of the rolling bodies 4. For this purpose, the sleeve 12 forms a labyrinth seal 28 with a sealing element 29. The rolling bearing 1 also has a second sealing element 30 in order to minimize the leakage of lubricant and to prevent dirt from penetrating into the area of the rolling bodies 4.

Figure 2:
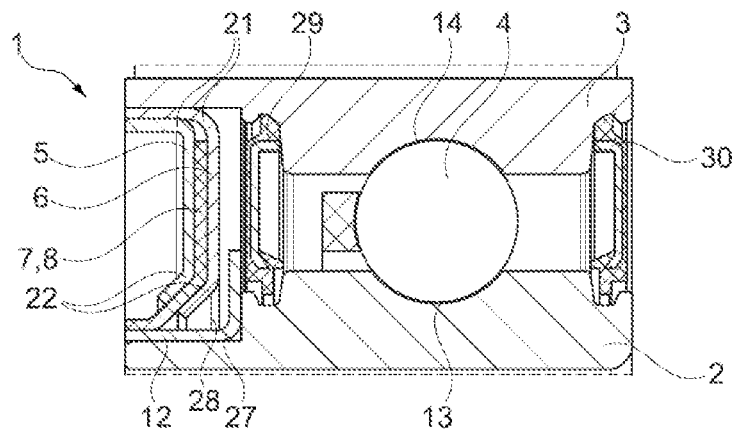
FIG. 2 shows a further exemplary embodiment for a rolling bearing with an integrated current-removal function.

FIG. 2 shows a further exemplary embodiment of a rolling bearing 1. With essentially the same structure as in FIG. 1, the plates 5, 6 in this exemplary embodiment are installed rotated by 180° in comparison with the embodiment shown in FIG. 1. As a result, the bent angle 21 of the plates 5, 6 can serve as an insertion bevel, whereby assembly is simplified. In addition, this installation position improves the labyrinth effect of the labyrinth seal 28, such that the area of the rolling bodies 4 is better protected against dirt and the leakage of lubricant from this area is minimized. The electrically conducting element 7 again rests against the sleeve 12 at an angle of approximately 45°.

Figure 3:
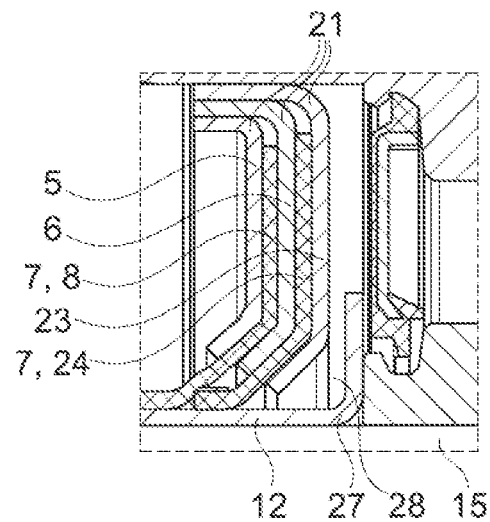
FIG. 3 shows a third exemplary embodiment for a rolling bearing with an integrated current-removal function, wherein two electrically conducting elements are provided in this embodiment variant which are each clamped between plates.

In FIG. 3 a third embodiment of a rolling bearing 1 is shown with a current-removal function. With essentially the same structure as in FIGS. 1 and 2, three plates 5, 6, 23 are provided in this exemplary embodiment, between which two electrically conducting elements 7 are arranged, which are separated from one another by the central plate 6. The electrically conducting elements 7 are preferably formed as fabric blanks 8, 17, 24, wherein electrically conducting threads are woven into the fabric of the fabric blanks 8, 17, 24 in order to increase the electrical conductivity of the fabric. The electrically conducting elements 7 rest on the sleeve 12, which is arranged on a shaft 15. Alternatively, the sleeve 12 can also be pressed onto the inner ring 2 of the rolling bearing 1.

Figure 4:
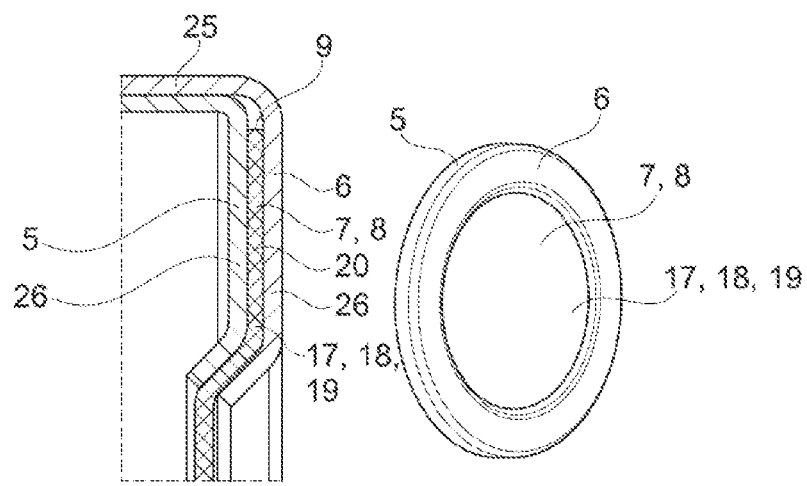
FIG. 4 shows an arrangement of two annular plates, between which an electrically conducting element is clamped.

FIG. 4 shows an assembly which comprises a first plate 5 and a second plate 6 as well as an electrically conducting element 7 clamped between the two plates 5 and 6. The plates 5, 6 have a press-in section 25 with which the plates 5, 6 are pressed into the outer ring 3 of the rolling bearing 1 and a clamping section 26 in which the electrically conducting element 7 is clamped with a press fit 9 between the two plates 5, 6. The electrically conducting element 7 is designed in the form of a flexible blank 8, in particular a fabric blank 17, a non-woven disc 18 or a disc 19 or film made of a polymer material. The blank 8 is provided with conductive elements 20, for example electrically conducting threads or electrically conducting additives such as carbon black, graphite, carbon, nanotubes or the like, in order to increase the electrical conductivity of the blank.

Figure 5:
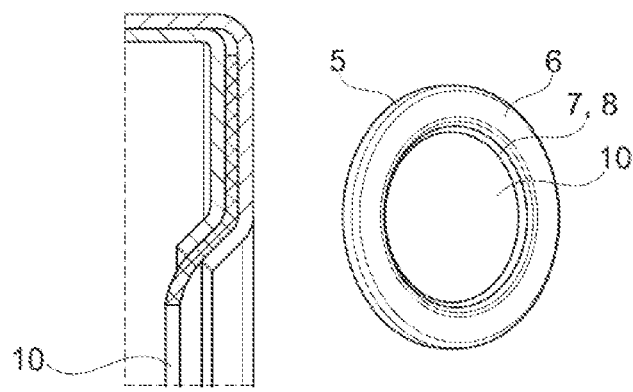
FIG. 5 shows an arrangement of the same type after a central opening has been made in the electrically conducting element.

A central opening 10 is made in the electrically conducting element 7, wherein the cutting or punching of the opening 10 is simplified by clamping the electrically conducting element 7 between the two plates 5, 6. An assembly with two plates 5, 6 and an electrically conducting element 7, into which a central opening 10 has been made, is shown in FIG. 5.

Figure 6:
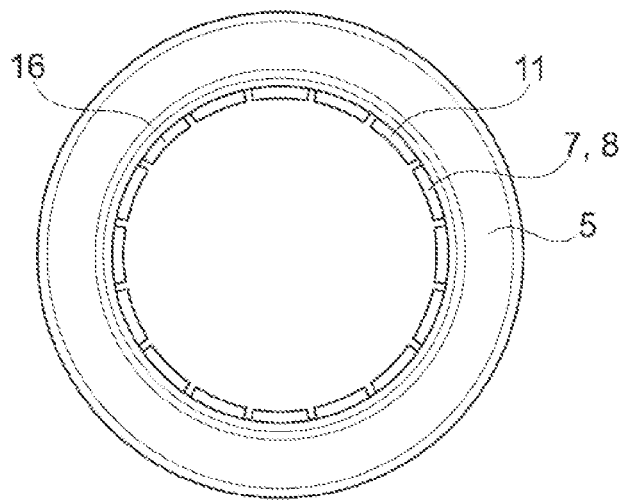
FIG. 6 shows an alternative embodiment of such an arrangement, wherein a plurality of contact segments distributed over the circumference are formed on the electrically conducting element.

FIG. 6 shows a further representation of such an assembly, wherein in this embodiment the electrically conducting element 7, in addition to the opening 10, is divided into a plurality of contact segments 11, preferably evenly distributed over the circumference. By dividing it into a plurality of contact segments 11, the friction between the electrically conducting element 7 and the inner ring 2 or the shaft 15 can be further reduced. The contact segments 11 lie as sliding elements 16 on the shaft 15 or the inner ring 2, wherein a current path between the inner ring 2 and the outer ring 3 is closed by the sliding contact on the sliding elements 16, such that an electrical potential difference between the inner ring 2 and the outer ring 3 is possible.

LIST OF REFERENCE SYMBOLS

1 Rolling bearing
2 Inner ring
3 Outer ring
4 Rolling body
5 First plate
6 Second plate
7 Electrically conducting element
8 Blank
9 Press fit
10 Opening
11 Contact segment
12 Sleeve
13 Raceway
14 Raceway
15 Shaft
16 Sliding element
17 Fabric blank
18 Non-woven disc
19 Disc
20 Conductive elements
21 Angle
22 Bend
23 Third plate
24 Second blank
25 Press-in section (of the plate)
26 Clamping section (of the plate)
27 Angle (of the sleeve)
28 Labyrinth
29 First sealing element
30 Second sealing element

The invention claimed is:

1. A rolling bearing for rotatably supporting a shaft, the bearing comprising:
    an inner ring with a first raceway,
    an outer ring with a second raceway,
    rolling bodies arranged between the first raceway and the second raceways,
    a pair of plates fastened to one of the inner ring or the outer ring, and
    an electrically conducting element arranged between the pair of plates, the electrically conducting element contacting:
        the other one of the inner ring or the outer ring, or
        a component which is electrically connected to the other one of the inner ring or the outer ring, wherein:
    the pair of plates have respective bends that guide the electrically conductive element so that the electrically conductive element lies at an angle deviating from a right angle on a cylindrical surface of the inner ring, the outer ring or the component.

2. The rolling bearing according to claim 1, wherein the electrically conducting element has an opening through which the shaft rotatably supported by the rolling bearing can be passed.

3. The rolling bearing according to claim 1, wherein the pair of plates are annular.

4. The rolling bearing according to claim 1, wherein the electrically conducting element is designed as a fabric blank or a non-woven disc.

5. The rolling bearing according to claim 4, wherein electrically conducting threads and/or electrically conducting additives are incorporated into the fabric of the fabric blank or into the non-woven disc.

6. The rolling bearing according to claim 1, wherein the electrically conducting element is designed as a disc or a film made of a polymer material, and the disc or the film is provided with electrically conducting additives.

7. The rolling bearing according to claim 1, wherein a sleeve is arranged on the inner ring or on the shaft.

8. The rolling bearing according to claim 7, wherein the sleeve has a first area which runs parallel to a surface of the shaft or the inner ring and a second area which runs at an angle to the first area such that the second area prevents or reduces leakage of lubricant from an area of the rolling bodies, so that a contact point between the electrically conducting element and the inner ring or the shaft is kept essentially free of lubricant.

9. A rolling bearing comprising:
    a first ring and a second ring;
    rolling bodies arranged between the first ring and the second ring;
    a pair of plates fastened to the first ring; and
    an electrically conductive element arranged between the pairs of plates, the pair of plates having respective bends that guide the electrically conductive element so that the electrically conductive lies at an angled deviating from a right angle on a cylindrical surface of the second ring, a shaft or a component that the electrically conductive element contacts.

10. The rolling bearing according to claim 9, wherein the electrically conductive element has an opening through which a shaft can be passed.

11. The rolling bearing according to claim 9, wherein the pair of plates are annular.

12. The rolling bearing according to claim 9, wherein the electrically conductive element is a fabric blank or a non-woven disc.

13. The rolling bearing according to claim 12, wherein electrically conductive thread and/or electrically conductive additives are incorporated into the fabric of the fabric blank or into the non-woven disc.

14. The rolling bearing according to claim 9, wherein the electrically conductive element is a disc or a film made of a polymer material, and the disc or the film is provided with electrically conducting additives.

15. The rolling bearing according to claim 9, wherein a sleeve is arranged on the second ring.

16. The rolling bearing according to claim 15, wherein the sleeve has a first area which runs parallel to a surface of the second ring and a second area which runs at an angle to the first area such that the second area prevents or reduces leakage of lubricant from an area of the rolling bodies.

\* \* \* \* \*